(12) United States Patent
Riehl et al.

(10) Patent No.: US 12,339,142 B2
(45) Date of Patent: Jun. 24, 2025

(54) POSITION TRANSMITTER, LINEAR ACTUATOR AND POSITION DETERMINATION METHOD

(71) Applicant: Ewellix AB, Gothenburg (SE)

(72) Inventors: Christoph Riehl, Liestal (CH); Urs Kunz, Liestal (CH)

(73) Assignee: Ewellix AB, Gothenburg (SE)

( * ) Notice: Subject to any disclaimer, the term of this patent is extended or adjusted under 35 U.S.C. 154(b) by 193 days.

(21) Appl. No.: 18/336,483

(22) Filed: Jun. 16, 2023

(65) Prior Publication Data

US 2024/0011803 A1  Jan. 11, 2024

(30) Foreign Application Priority Data

Jul. 11, 2022 (DE) .................. 10 2022 117 186.8

(51) Int. Cl.
*G01D 5/24* (2006.01)
*G01D 5/241* (2006.01)

(52) U.S. Cl.
CPC .................................. *G01D 5/2415* (2013.01)

(58) Field of Classification Search
CPC ........ G01D 5/2415; G01B 7/003; G01B 7/02; G01B 7/30
See application file for complete search history.

(56) References Cited

U.S. PATENT DOCUMENTS

| | | |
|---|---|---|
| 3,732,553 A | 5/1973 | Hardway, Jr. |
| 4,449,179 A | 5/1984 | Meyer |
| 5,077,635 A | 12/1991 | Bollhagen et al. |
| 5,598,153 A | 1/1997 | Brasseur et al. |
| 2006/0028215 A1* | 2/2006 | Berting ................ G01D 5/2415 324/662 |
| 2007/0008230 A1* | 1/2007 | Osaka ..................... H01Q 3/02 343/702 |
| 2008/0284417 A1* | 11/2008 | Speckmann ......... G01D 5/2492 324/207.15 |

(Continued)

FOREIGN PATENT DOCUMENTS

| | | |
|---|---|---|
| DE | 3020411 A1 | 12/1981 |
| DE | 4016434 A1 | 11/1991 |
| DE | 102005054342 A1 | 5/2007 |

(Continued)

*Primary Examiner* — Alvaro E Fortich
(74) *Attorney, Agent, or Firm* — Laurence A. Greenberg; Werner H. Stemer; Ralph E. Locher

(57) ABSTRACT

A position transducer, a linear actuator and a method for determining a position of two components in relation to each other. The position transducer having measuring unit and a first, second, and third electrode assembly. The third electrode assembly capacitively couples the first and the second electrode assemblies to each other and is movable in relation thereto. The measuring unit is electrically conductively connected to the first electrode assembly by a first line assembly and to the second electrode assembly by a second line assembly. The measuring unit is configured to emit at least one excitation signal via the first line assembly and receive at least one readout signal via the second line assembly. The measuring unit is also designed to determine, based on readout signal, a position of the third electrode assembly in relation to the first and the second electrode assemblies.

15 Claims, 3 Drawing Sheets

(56) References Cited

U.S. PATENT DOCUMENTS

2012/0217957 A1\* 8/2012 Piaton .................... G01D 5/145
                                                      324/207.25
2022/0065666 A1\* 3/2022 Riehl ..................... H02K 11/21

FOREIGN PATENT DOCUMENTS

DE        102020122368 A1    3/2022
EP             0551066 A1    7/1993

\* cited by examiner

POSITION TRANSMITTER, LINEAR ACTUATOR AND POSITION DETERMINATION METHOD

FIELD AND BACKGROUND OF THE INVENTION

The present invention relates to a position transducer, a linear actuator and a method for determining a position of two components in relation to each other.

Position transducers are known for the purpose of determining positions of two components in relation to each other. In particular, these position transducers can be used to detect and quantify position changes, i.e., a translatory displacement, or angle changes. In this respect, position transducers are often used to determine the position of a linear actuator.

SUMMARY OF THE INVENTION

One problem addressed by the present invention is that of improving a determination of a position of two components in relation to each other, in particular of reducing the amount of space required therefor, and of simplifying the design of a position transducer used therefor.

This problem is solved by a position transducer, a linear actuator and a method for determining a position of two components in relation to each other, according to the independent claims.

Preferred embodiments are the subject matter of the dependent claims and of the following description.

A position transducer according to a first aspect of the invention, in particular for a linear actuator, includes a measuring unit, at least one first electrode assembly, at least one second electrode assembly and at least one third electrode assembly. The third electrode assembly capacitively couples the first and the second electrode assemblies to each other and is movable in relation thereto. According to the invention, the measuring unit is electrically conductively connected to the first electrode assembly by a first line assembly and to the second electrode assembly by a second line assembly. The measuring unit is designed to emit a sequence of preferably identical excitation signals via the first line assembly and to receive at least one readout signal, in particular a sequence of readout signals, via the second line assembly. The measuring unit is also designed to determine a position of the third electrode assembly in relation to the first and the second electrode assemblies on the basis of the readout signal (or the sequence of readout signals).

An electrically conductive connection within the scope of the invention is preferably a direct connection, via which an electrical current or voltage signal is transmissible without being adversely affected to a substantial extent by the connection. An electrically conductive connection excludes, in particular, a capacitive coupling, in which an electrical line is interrupted by a capacitive element.

One aspect of the invention is based on the approach of directly exciting an electrode configuration—which is known, per se—of a position transducer, which is made up of a first and a second electrode assembly and a third electrode assembly, which capacitively couples the first and the second electrode assemblies, using one or multiple excitation signal(s). For this purpose, a first line assembly is advantageously provided, which electrically conductively connects a measuring unit to the first electrode assembly. Appropriate interrogation signals can be received via a second line assembly, which electrically conductively connects the measuring unit to the second electrode assembly. A position of the third electrode assembly in relation to the first and the second electrode assemblies is derivable from the interrogation signals. A dedicated excitation line of the type which is provided in conventional position transducers can be dispensed with. This not only allows for less complex manufacturing of the position transducer according to the invention, but also reduces the amount of space required.

The electrode assemblies are advantageously designed such that the first electrode assembly and the second electrode assembly, each in combination with the third electrode assembly, form one or multiple capacitance(s) in each case. The electrode assemblies are preferably designed such that the capacitances that are formed change due to a movement of the third electrode assembly in relation to the first and the second electrode assemblies. The capacitances can be derived from the interrogation signals.

The first and the second electrode assemblies each preferably form one measuring track. In other words, preferably one pair of measuring tracks is provided, in which a first measuring track has the first electrode assembly and a second measuring track has the second electrode assembly. The third electrode assembly is advantageously assigned to the pair of measuring tracks. The movement of the third electrode assembly in relation to the first and the second electrode assemblies is preferably coupled or couplable to a movement of one component in relation to another component such that the position of the third electrode assembly in relation to the first and the second electrode assemblies corresponds to the relative position of the two components.

Preferred embodiments of the invention and their developments are described in the following. These embodiments can be arbitrarily combined with each other and with the aspects of the invention described in the following, provided this is not expressly ruled out.

In one preferred embodiment, the third electrode assembly has a plurality of third electrode units. The third electrode units are preferably designed to form capacitances with the first and the second electrode units of the first and the second electrode assemblies. Each electrode unit can correspond to an electrically conductive area. The capacitances result, for example, due to the overlap of first or second areas, which correspond to the first or the second electrode units, respectively, with third areas, which correspond to the third electrode units.

Preferably, all third electrode units are electrically conductively connected to each other. Therefore, a circuit is not necessary to capacitively couple the first and the second electrode assemblies to each other. In this respect, the complexity of the position transducer can be significantly reduced.

In one further preferred embodiment, the first line assembly has a separate line to each first electrode unit of the first electrode assembly. Alternatively or additionally, the second line assembly has a separate line to each second electrode unit of the second electrode assembly. As a result, single ones of the first electrode units can be excited in a targeted manner with an excitation signal and/or read out an interrogation signal that has been generated by a second electrode unit, i.e., induced in a second electrode unit. In this respect, multiple channels can be realized, which can be actuated and read out individually.

In particular, the first electrode assembly can have a first number of first electrode units and the second electrode assembly can have a second number of second electrode units. Advantageously, the first number corresponds to the second number. If multiple pairs of measuring tracks are provided, the first line assembly preferably has a number of lines that corresponds to the first number, the lines extending to each of multiple first electrode units of various first electrode assemblies. As a result, the number of lines needed and thus the space requirement can be reduced. In particular, less complex manufacturing is therefore possible.

A number of electrode units, each of which is connected to the measuring unit by the same line of the first line assembly, is given, for example, by a number of the first electrode assemblies, i.e., the number of pairs of measuring tracks.

In one further preferred embodiment, the measuring unit is designed to emit a sequence of the excitation signal, i.e., of a temporally distributed excitation signal, and/or of a frequency-distributed excitation signal. Preferably, the measuring unit is designed to correspondingly receive multiple interrogation signals. Advantageously, the measuring unit is also designed to determine the position of the third electrode assembly in relation to the first and the second electrode assemblies from such a sequence or such a frequency spectrum. The sequential or frequency-distributed emission of the excitation signals and the corresponding receipt of the interrogation signals allows for an efficient use of the line assemblies. In this respect, the sequence- or frequency-based operation also makes it possible to reduce the number of lines that are necessary.

A sequential emission of the excitation signal is preferably a chronologically consecutive emission of the same excitation signal. An emission of a frequency-distributed excitation signal is preferably an emission of an excitation signal having multiple frequencies, i.e., one (discrete) frequency spectrum. Due to the frequency distribution of the excitation signal, an interrogation signal can be generated or tapped simultaneously at each of the second electrode units, at another frequency of the spectrum in each case.

In order to be able to determine the position of the second electrode assembly in relation to the third electrode assembly, the measuring unit is designed, for example, to excite all first electrode units with the same excitation signal via the first line assembly multiple times or in a frequency-distributed manner. The number of excitations or frequencies preferably corresponds to the first number, i.e., the number of first electrode units. Advantageously, the measuring unit is also designed to receive, for each excitation or frequency, an interrogation signal in a targeted manner from one other second electrode unit via the second line assembly in each case. In other words, the capacitive coupling between the third electrode assembly and the individual second electrode units is probed in a targeted manner, for example, via a broad excitation of the first electrode assembly.

In this respect, the measuring unit is preferably designed to determine a capacitance from each of the received interrogation signals. Advantageously, every capacitance determined in this way is assigned or assignable to one of the second electrode units. The capacitances quantified in this way, in particular their relationship to one another, make it possible to infer the position of the second electrode assembly in relation to the third electrode assembly.

In order to be able to determine the position of the first electrode assembly in relation to the third electrode assembly, the measuring unit is designed, for example, to excite a first electrode unit multiple times or in a frequency-distributed manner with a first excitation signal and, simultaneously, not to excite the remaining first electrode units or to excite these with a second excitation signal, which differs from the first excitation signal, via the first line assembly.

The second excitation signal can be an excitation signal that is oppositely polarized as compared to the first excitation signal.

The number of excitations preferably corresponds to the second number, i.e., the number of second electrode units. Advantageously, the measuring unit is also designed to receive, for each excitation or frequency, one interrogation signal from one other second electrode unit via the second line assembly in each case. In other words, the capacitive coupling between the third electrode assembly and the individual first electrode units is probed, for example, via a targeted excitation of the first electrode assembly, wherein the coupling advantageously results from taking multiple interrogation signals at the second electrode units into account.

In this respect, the measuring unit is preferably designed to determine a capacitance from each of the received interrogation signals and adding up the determined capacitances. Advantageously, the capacitance that has been added up in this way is assigned or assignable to the first electrode unit, which has been excited with the predefined excitation signal.

Preferably, the measuring unit is designed to carry out the repeated or frequency-distributed excitation with the first excitation signal and the simultaneous excitation of the remaining first electrode units with the second excitation signal in succession for each first electrode unit.

In one further preferred embodiment, the measuring unit, the first electrode assembly and the second electrode assembly are formed on a printed circuit board, in particular being printed thereon. This allows for less complex manufacturing.

Preferably, the third electrode assembly is arranged on a body, which is movably mounted on the printed circuit board, in particular so as to be displaceable in a rotatable or translatory manner. In order to reduce complexity, the body is advantageously made, at least in some areas, of a conductive plastic, which can form the third electrode units.

Advantageously, a dielectric is arranged between the first electrode assembly and the third electrode assembly and a dielectric is arranged between the second electrode assembly and the third electrode assembly.

In one further preferred embodiment, multiple first electrode assemblies, multiple second electrode assemblies and multiple third electrode assemblies are provided. In other words, multiple pairs of measuring tracks can be provided, for example, in order to further increase the precision of the determinable relative component position from the determined positions of the third electrode assemblies in relation to the first and the second electrode assemblies and/or to expand the measuring range. A Nonius principle is therefore realizable, in particular, with two first, second and third electrode assemblies, i.e., two pairs of measuring tracks.

Preferably, each first electrode assembly has three first electrode units and each second electrode assembly has three second electrode units. It has been shown that the three channels formed as a result enable good precision in the determination of the position of the first or the second electrode assembly in relation to the third electrode assembly with the measuring unit in combination with reasonable (interconnection) complexity.

In one further preferred embodiment, the first and the second electrode assemblies each have a plurality of first and second electrode units, wherein a first electrode unit and/or a second electrode unit include(s) multiple electrode elements, which are electrically connected to one another. For example, a first electrode unit and/or a second electrode unit can have multiple conductive areas, which are electrically connected to each other. These electrode elements are advantageously arranged at regular intervals, in particular in a fixed sequence with the electrode elements of the other electrode units. As a result, the measuring accuracy can be increased and/or the measuring range can be expanded.

A linear actuator according to the second aspect of the invention includes a linear unit and a position transducer according to the first aspect of the invention. The linear unit is designed to generate a translatory motion from a rotatory motion, for example, from the rotation of a motor shaft. For example, the linear unit can have a threaded spindle, which is driven by a motor, and a spindle nut running on the threaded spindle. Advantageously, a translatory motion of a component of the linear unit, for example, of the spindle nut, generated via the actuation of the linear unit is coupled to a motion of the third electrode assembly in relation to the first and the second electrode assemblies. A gear unit, for example, one or multiple gear(s), can be provided for this purpose. Using the position transducer, therefore, a position of the linear actuator, for example, the position of the spindle nut on the threaded spindle, can be precisely and reliably determined in an installation-space-favorable manner.

In the method according to a third aspect of the invention for determining a position of two components in relation to each other, in particular using a position transducer according to the first aspect of the invention, a first electrode assembly is excited via a first line assembly with at least one excitation signal, in particular an excitation sequence made up of multiple (identical) excitation signals. Conditional upon this excitation, preferably at least one interrogation signal is generated in a second electrode assembly, which is capacitively coupled to the first electrode assembly via a third electrode assembly, which is movable in relation to the first and the second electrode assemblies. It is preferred that the interrogation signal is received via a second line assembly and, on the basis of the interrogation signal, a position of the third electrode assembly in relation to the first and the second electrode assemblies is determined. The position of the third electrode assembly in relation to the first and the second electrode assemblies determined in this way can be assigned to the relative position of two components, the relative motion of which is advantageously coupled to the motion of the third electrode assembly in relation to the first and the second electrode assemblies.

In addition, the invention is explained in greater detail with reference to figures. To the extent this is practical, identically acting elements are provided with identical reference signs. The invention is not limited to the exemplary embodiments shown in the figures—also not with respect to functional features. The previous description as well as the following description of the figures include numerous features which have been combined, in part, to form several groups in the dependent claims. A person skilled in the art will also consider these features as well as all remaining figures that have been disclosed above and in the following description of the figures individually, however, and combine them to form other meaningful combinations. In particular, all aforementioned features are each combinable individually and in an arbitrary suitable combination with the position transducer according to the first aspect of the invention, the linear actuator according to the second aspect of the invention and the method according to the third aspect of the invention.

BRIEF DESCRIPTION OF THE FIGURES

As least partially schematically.

DETAILED DESCRIPTION OF THE INVENTION

Figure 1:
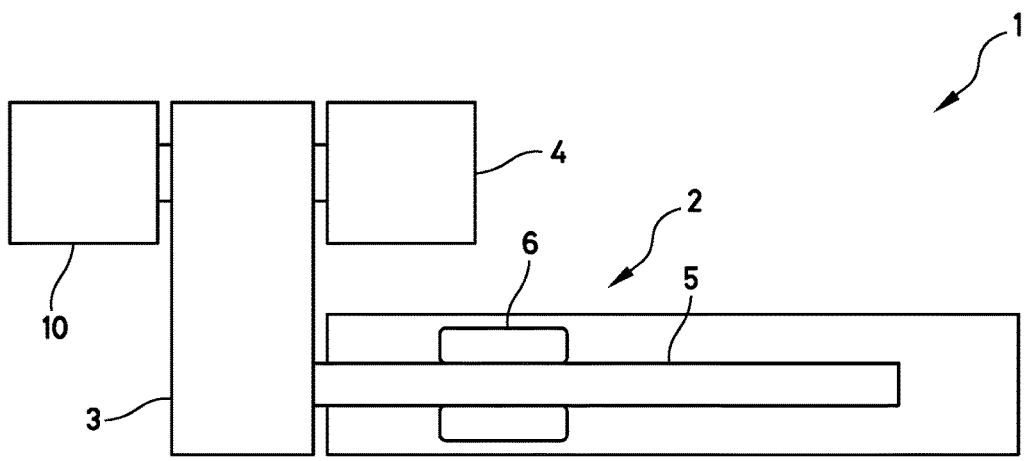
FIG. 1 shows an example of a linear actuator including a linear unit and a position transducer.

FIG. 1 shows an example of a linear actuator 1 including a linear unit 2 and a position transducer 10. The linear unit 2 and the position transducer 10 are coupled to a motor 4 via a gear unit 3. As a result, a rotation generated by the motor 4 is converted by the linear unit 2 into translation and by the position transducer 10 into a movement of a third electrode assembly in relation to a first and a second electrode assembly (see FIG. 2). For example, the rotation transmitted from the motor 4 onto a threaded spindle 5 generates a translation of a spindle nut 6 running on the threaded spindle 5. The position of the spindle nut 6 in relation to the threaded spindle 5 corresponds to the position of the third electrode assembly in relation to the first and the second electrode assemblies. In this respect, a position of the linear actuator 1, in particular of the linear unit 2 or of the spindle nut 6, can be determined using the position transducer 10.

Figure 2:
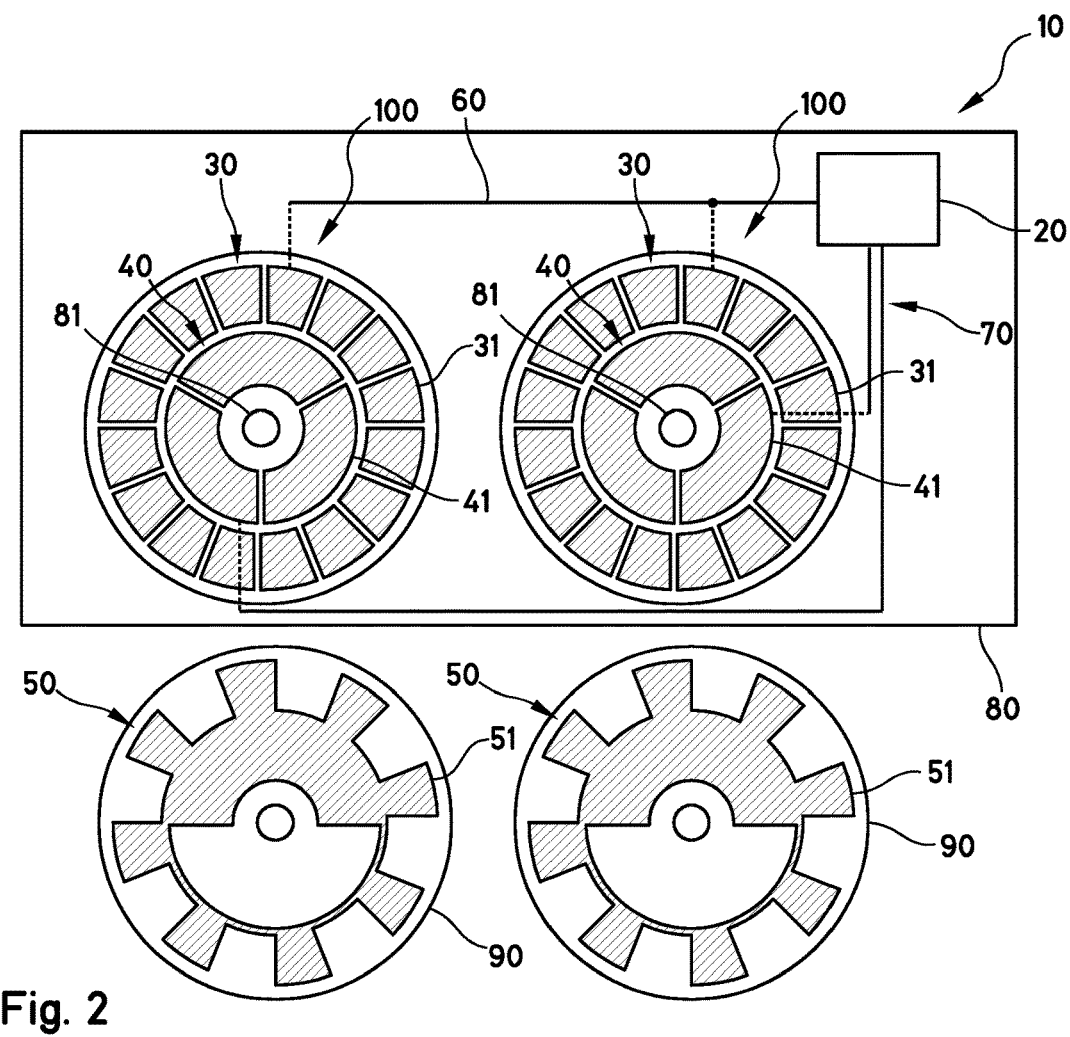
FIG. 2 shows an example of a physical embodiment of a position transducer.

FIG. 2 shows an example of a physical embodiment of a position transducer 10 including a measuring unit 20, two first electrode assemblies 30, two second electrode assemblies 40 and two third electrode assemblies 50. The measuring unit 20 is electrically conductively connected to the first electrode assemblies 30 via a first line assembly 60 and to the second electrode assemblies 40 via a second line assembly 70.

The measuring unit 20, the first and the second electrode assemblies 30, 40 and the line assemblies 60, 70 are formed on a printed circuit board 80, in particular being at least partially printed thereon.

The third electrode assemblies 50, however, are each arranged on a preferably disk-shaped body 90. The third electrode assemblies 50 can also be at least partially formed by the bodies 90. To this end, the bodies 90 are preferably made, at least partially, of a conductive plastic.

The bodies 90 are shown underneath the printed circuit board in FIG. 2 for better visibility of the first and the second electrode assemblies 30, 40. In the operational state, the bodies 90 are each advantageously rotatably mounted on the printed circuit board 80, however, for example, using pins or any other type of spindle that will be or is inserted, for example, into an appropriate through-hole 81 in the printed circuit board 80. Other mountings are also conceivable, however. A dielectric (not shown) is or will be advantageously arranged between the bodies 90 and the printed circuit board 80.

The bodies 90 are advantageously arranged such that the third electrode assemblies 50 are each situated opposite a first and a second electrode assembly 30, 40, respectively. The third electrode assemblies 50 are therefore rotatable in relation to the first and the second electrode assemblies 30, 40 such that the position transducer 10 can measure an angular position of the bodies 90.

Alternatively to the rotatable mounting of the bodies 90 on the printed circuit board 80, a translatory mounting, for example, a sliding mounting, is also conceivable. In this case, the bodies 90 are advantageously designed in the form of a ruler. Consequently, the position transducer 10 can measure a translatory displacement.

The first, the second and the third electrode assemblies 30, 40, 50 advantageously each have multiple first, second and third electrode units 31, 41, 51, only a few of which are provided with a reference sign for the sake of clarity. Each of the first and the second electrode units 31, 41 can include multiple electrode segments, which are advantageously electrically conductively connected to one another.

The third electrode units 51 are preferably electrically conductively connected to one another. As a result, each of the third electrode assemblies 50 capacitively couples a first electrode assembly 30 to a second electrode assembly 40. The first and the second electrode assemblies 30, 40 coupled in this way each form one pair 100 of measuring tracks, with which the position of the coupling third electrode assembly 50 is determinable in relation to the first and the second electrode assemblies 30, 40 and thus of the body 90 in relation to the printed circuit board 80.

The first and the second electrode units 31, 41 are preferably formed separately, i.e., not electrically conductively connected to one another. The first and the second electrode units 31, 41 can form capacitances with the respective third electrode assembly 50. These capacitances advantageously change when the third electrode assembly 50 moves in relation to the first and the second electrode assemblies 30, 40, for example, due to the shape and/or arrangement of the first and the second electrode units and/or the third units 31, 41, 51.

Consequently, the measuring unit 20 can excite each pair of measuring tracks by means of at least one excitation signal, in particular a predefined sequence of multiple (identical) excitation signals and/or a frequency-distributed excitation signal, and determine the capacitances that have formed on the basis of one or multiple appropriate readout signals. Advantageously, the capacitances determined in this way correspond to the position of the third electrode assemblies 50 in relation to the first and the second electrode assemblies 30, 40.

For example, the measuring unit 20 can be designed to apply at least one excitation signal at the first electrode assemblies 30 via the first line assembly 60. Due to the capacitive coupling via the third electrode assemblies 50, an appropriate readout signal is generated by the second electrode assemblies 40. The measuring unit 20 is advantageously designed to receive this readout signal via the second line assembly 70.

Via a coupling of the bodies 90 to a movable component, for example, a motor shaft, and via a gear unit if necessary, a position of the component in relation to another, stationary component can be determined using the position transducer 10.

Figure 3:
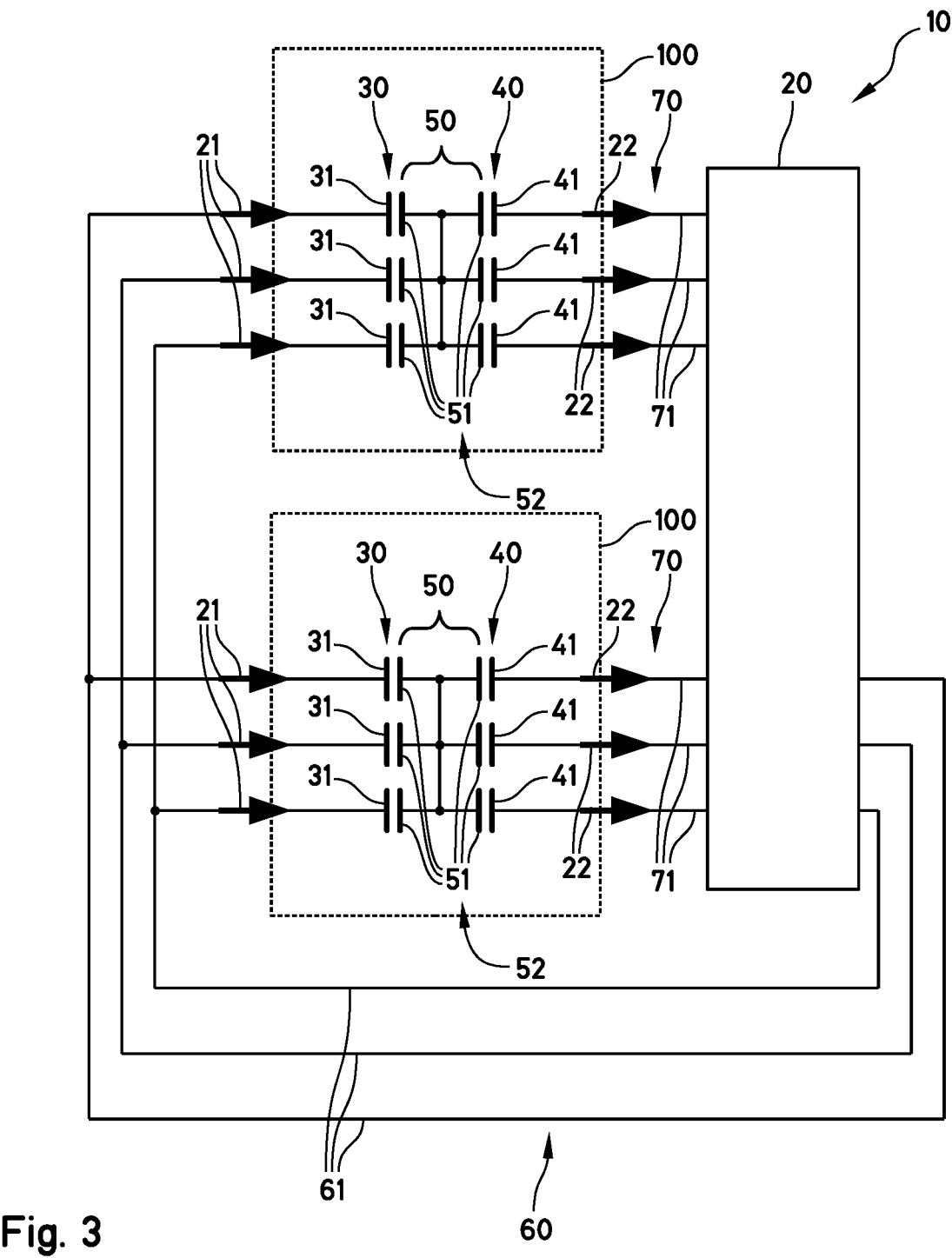
FIG. 3 shows an example of a circuitry-based embodiment of a position transducer.

FIG. 3 shows an example of a circuitry-based embodiment of a position transducer 10 having two first and second electrode assemblies 30, 40, which form two pairs of measuring tracks 100 and are each capacitively coupled to a third electrode assembly 50. A measuring unit 20 is electrically conductively connected via a first line assembly 60 to first electrode units 31 of the first electrode assemblies 30 and via a second line assembly 70 to second electrode units 41 of the second electrode assembly 40.

The second line assembly 70 has a separate line 71 for each second electrode unit 41. The first line assembly 60, however, has a number of lines 61, which corresponds to a first number of first electrode units 31 of one of the first electrode assemblies 30. Each of these lines 61 connects the measuring unit 20 to two first electrode units 31, namely to one electrode unit 31 of each of the two first electrode assemblies 30.

This allows the measuring unit 20 to apply excitation signals 21 to first electrode units 31 in a targeted manner and/or to receive, in a targeted manner, a readout signal 22 that has been subsequently generated by a second electrode unit 41, for example, induced in this electrode unit 41.

In order to make various excitation and readout combinations possible, the third electrode assemblies 50 each advantageously have multiple third electrode units 51, which are electrically conductively connected to each other. In this respect, the third electrode assemblies 50 define a star connection 52 for each of the pairs of measuring tracks 100.

Figure 4:
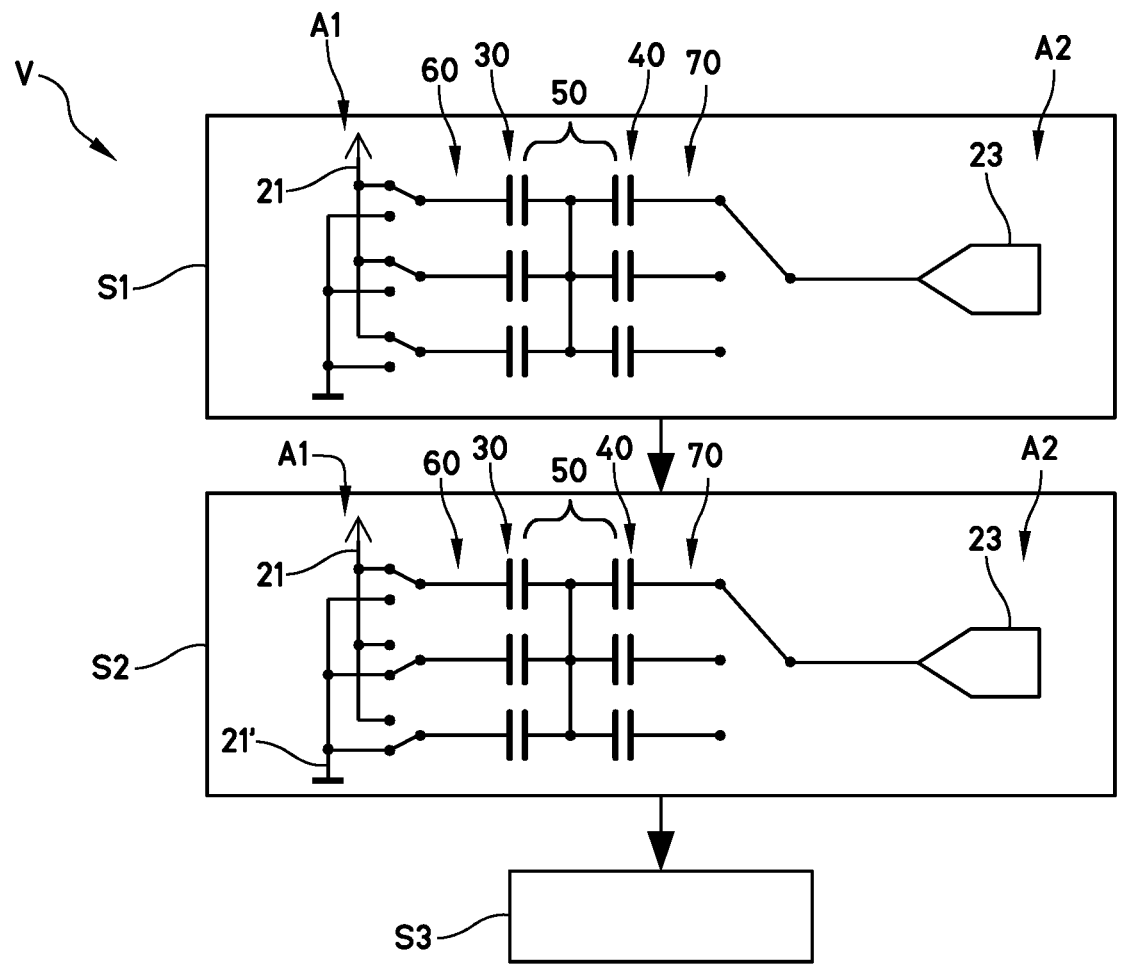
FIG. 4 shows an example of a method for determining a position of two components in relation to each other.

FIG. 4 shows an example of a method V for determining a position of two components in relation to each other. A sequence of a predefined excitation signal 21, for example, the (same) excitation signal 21 multiple times, is emitted via a first line assembly 60 to first electrode units of at least one first electrode assembly 30, and corresponding readout signals, which have been tapped at a second electrode assembly 40, are received via a second line assembly 70.

In a first sequence step S1, the excitation signal 21 is repeatedly applied to all first electrode units of the at least one first electrode assembly 30 in an excitation step A1. Upon each repetition, the readout signal is received in a readout step A2 via another second electrode unit. Such an excitation step A1 and readout step A2 are schematically shown as a connection diagram. The number of excitation and readout steps A1, A2 advantageously corresponds to the (total) number of second electrode units.

In other words, a readout signal can be induced, in a targeted manner, once in each second electrode unit and, for example, detected via an analog-to-digital converter 23 of the measuring unit. Each of these readout signals corresponds to a capacitance of the corresponding second electrode unit.

If, for example, two first and two second electrode assemblies 30, 40 are each provided with three first and second electrode units, the first sequence step S1 includes the emission A1 of excitation signals six times, one to each of all first electrode units, and the receipt A2 of a readout signal six times via one each of another of the second electrode units.

In one second sequence step S2, a first excitation signal 21 is repeatedly applied to a first electrode unit of the at least one first electrode assembly 30 in the excitation step A1. In the same excitation step A1, a second excitation signal 21', which differs from the first excitation signal 21, for example, by being oppositely polarized, is simultaneously applied to the remaining first electrode units.

Alternatively, an excitation signal cannot be applied to the remaining first electrode units. Upon each of these repetitions, the readout signal is received in a readout step A2 via another second electrode unit. Such an excitation step A1 and readout step A2 are schematically shown as a connection diagram. The number of excitation and readout steps A1, A2 advantageously corresponds to the (total) number of second electrode units.

In other words, a readout signal can be induced, in a targeted manner, once in each second electrode unit and detected via an analog-to-digital converter 23. Each of these readout signals corresponds to a capacitance, which, added up, is assignable to the first electrode unit, to which the predefined excitation signal 21 has been applied.

The second sequence step S2 is advantageously repeated for each first electrode unit of the at least one first electrode assembly 30.

If, for example, two first and second electrode assemblies 30, 40 are each provided with three first and second electrode units, respectively, the second sequence step S2 includes the emission A1 of the first excitation signal 21 eighteen times, three times to each of another one of the (six in all) first electrode units, optionally the emission A1 of the second excitation signal 21' eighteen times, three times to each of the remaining first electrode units, and receiving A2 a readout signal eighteen times via one each of another of the second electrode units.

In a third sequence step S3, a position of at least one third electrode assembly 50, which capacitively couples the first and the second electrode assemblies 30, 40, in relation to the first and the second electrode assemblies 30, 40 is determined from the received readout signals and the capacitances corresponding to the first and the second electrode units.

Alternatively, it is also conceivable to excite the first electrode assemblies with a frequency-distributed excitation signal, instead of with a sequence of excitation signals 21, in the sequence step S1, and to read out the readout signals simultaneously at the various second electrode units. Correspondingly, the first electrode units can be repeatedly excited with a frequency-distributed excitation signal in the second sequence step S2—namely once for each of the first electrode units—and the readout signals can be read out simultaneously at the various second electrode units.

LIST OF REFERENCE SIGNS 1 linear actuator
2 linear unit
3 gear unit
4 motor
5 threaded spindle
6 spindle nut
10 position transducer
20 measuring unit
21 excitation signal
21' oppositely poled excitation signal
22 readout signal
23 analog-to-digital converter
30 first electrode assembly
31 first electrode unit
40 second electrode assembly
41 second electrode unit
50 third electrode assembly
51 third electrode unit
52 star connection
60 first line assembly
61 line
70 second line assembly
71 line
80 printed circuit board
81 through-hole
90 body
100 pair of measuring tracks
V method
S1-S3 sequence steps
A1 excitation step
A2 readout step

The invention claimed is:

1. A position transducer, comprising:
a measuring unit;
a first electrode assembly;
a second electrode assembly; and
a third electrode assembly configured to capacitively couple the first and the second electrode assemblies to each other and said third electrode assembly being movable in relation to the first and second electrode assemblies;
the measuring unit being electrically conductively connected to the first electrode assembly by a first line assembly and to the second electrode assembly by a second line assembly, and said measuring unit being configured to
emit at least one excitation signal via the first line assembly,
receive at least one readout signal via the second line assembly, and
determine a position of the third electrode assembly in relation to the first and the second electrode assemblies based on the readout signal.

2. The position transducer according to claim 1, wherein:
the first electrode assembly has a plurality of first electrode units and the first line assembly has a separate line to each first electrode unit; and
the second electrode assembly has a plurality of second electrode units and the second line assembly has a separate line to each second electrode unit.

3. The position transducer according to claim 1, wherein:
the first electrode assembly has a first number of first electrode units and the second electrode assembly has a second number of second electrode units;
the second line assembly has a separate line to each second electrode unit; and
the first line assembly has a number of lines to each of multiple first electrode units of various first electrode assemblies, which corresponds to the first number.

4. The position transducer according to claim 3, wherein the number of first electrode units is determined by a number of the first electrode assemblies, and the number of first electrode units is connected to the measuring unit by the same line of the first line assembly.

5. The position transducer according to claim 1, wherein the measuring unit is configured to:
emit a sequence of the excitation signals and/or of a frequency-distributed excitation signal and correspondingly receive multiple readout signals,
determine the position of the third electrode assembly in relation to the first and the second electrode assemblies from such a sequence or such a frequency spectrum.

6. The position transducer according to claim 3, wherein the measuring unit is configured to:
excite all first electrode units of the first electrode assembly, repeatedly or in a frequency-distributed manner, with the same excitation signal via the first line assembly; and
for each excitation or frequency, receive a readout signal in a targeted manner from one of another second electrode unit of the second electrode assembly via the second line assembly.

7. The position transducer according to claim 6, wherein the measuring unit is configured to determine a capacitance from each of the received readout signals, and assign the determined capacitance to one of the second electrode units.

8. The position transducer according to claim 7, wherein the measuring unit is configured to:
excite the same electrode unit of the first electrode assembly, repeatedly or in a frequency-distributed manner, with a first excitation signal via the first line assembly;

simultaneously excite the remaining first electrode units of the first electrode assembly with a second excitation signal, which differs from the first excitation signal, via the first line assembly; and for each excitation or frequency, receive a readout signal from one of another second electrode unit of the second electrode assembly via the second line assembly.

9. The position transducer according to claim 8, wherein the measuring unit is configured to determine a capacitance from each of the received readout signals and add up the determined capacitances, and the determined capacitance is assigned to the first electrode unit, which has been excited with the excitation signal.

10. The position transducer according to claim 8, wherein the measuring unit is configured to carry out the repeated or frequency-distributed excitation with the first excitation signal and the simultaneous excitation of the remaining first electrode units with the second excitation signal in succession for each first electrode unit.

11. The position transducer according to claim 1, wherein:

the measuring unit, the first electrode assembly, and the second electrode assembly are printed on a printed circuit board;

the third electrode assembly is arranged on a body, which is rotatably mounted on the printed circuit board; and a dielectric is arranged between the first electrode assembly and the third electrode assembly and a dielectric is arranged between the second electrode assembly and the third electrode assembly.

12. The position transducer according to claim 1, further comprising:

multiple first electrode assemblies;
multiple second electrode assemblies;
multiple third electrode assemblies; and
each first electrode assembly having three first electrode units and each second electrode assembly having three second electrode units.

13. The position transducer according to claim 1, wherein the first and the second electrode assemblies each have a plurality of first and second electrode units, and the first electrode unit and/or the second electrode unit include(s) multiple electrode elements, which are electrically connected to one another.

14. A linear actuator comprising:

a linear unit; and
a position transducer according to claim 1.

15. A method for determining a position of two components in relation to each other using a measuring unit, the method comprising:

exciting a first electrode assembly with at least one excitation signal via a first line assembly to generate at least one readout signal in a second electrode assembly, which is capacitively coupled to the first electrode assembly by a third electrode assembly, which is movable in relation to the first and the second electrode assemblies;

receiving the readout signal via a second line assembly; and determining a position of the third electrode assembly in relation to the first and the second electrode assemblies based on the readout signal.

* * * * *